United States Patent [19]

Rusincovitch et al.

[11] Patent Number: 5,262,444

[45] Date of Patent: Nov. 16, 1993

[54] POROUS PLASTIC FILM PRODUCT, USEFUL AS A BREATHABLE WALL COVERING OR FILTERS

[75] Inventors: George Rusincovitch, Worthington; Paul J. Roe, Columbus; Richard C. Andrews, Gahanna, all of Ohio

[73] Assignee: Borden, Inc., Columbus, Ohio

[21] Appl. No.: 985,376

[22] Filed: Nov. 30, 1992

[51] Int. Cl.$^5$ .............................................. C08G 18/14
[52] U.S. Cl. ................................... 521/50.5; 521/73; 521/79; 521/85; 521/88; 521/90; 522/33; 522/39; 522/42; 522/44
[58] Field of Search ................ 521/50.5, 73, 79, 85, 521/88, 90; 522/33, 39, 42, 44, 915

[56] References Cited

U.S. PATENT DOCUMENTS

| | | | |
|---|---|---|---|
| 2,819,981 | 1/1958 | Schornstheimer et al. | 427/246 |
| 4,713,264 | 12/1987 | Clark et al. | 427/207.1 |
| 4,828,881 | 5/1989 | Brown et al. | 427/208 |
| 4,894,274 | 1/1990 | Graham et al. | 428/151 |

*Primary Examiner*—Maurice J. Welsh
*Attorney, Agent, or Firm*—Dennis H. Rainear; Kenneth P. Van Wyck

[57] ABSTRACT

The invention relates to a breathable, plastic film, useful as a wall covering material. A low boiling additive, such as water, is added to a plastisol before extrusion. During extrusion and curing of the plastisol into a film or coating, the low boiling additive is volatilized and the resulting evolved gas perforates the forming film. In this manner a permeable plastic film, such as vinyl, is produced.

57 Claims, No Drawings

POROUS PLASTIC FILM PRODUCT, USEFUL AS A BREATHABLE WALL COVERING OR FILTERS

BACKGROUND OF THE INVENTION

Conventional vinyl wall covering products, whether calendered, extruded or plastisol coated, act like a vapor barrier when applied to a wall. For many applications such as, for example, bathrooms and kitchens, this is a desirable feature. In bathrooms, the moisture collects on the outside of the wall covering exposed to the room, whereas paper wall coverings would become saturated and soggy. In kitchens or other areas where splattering or marks require frequent washing, again a moisture barrier wall covering is desired.

However, certain applications would benefit from porous, semiporous, semipermeable, also called breathable, wall covering products. One particular circumstance in which moisture barrier wall coverings are not desired is homes, hotels, motels, offices and commercial decorating in geographic regions of very high humidity, such as the Southern United States. The high moisture level in the air permeates the walls from the exterior inwardly resulting in condensation on the outside surface of vinyl wall coverings of rooms cooled by air conditioning. As a result, the condensate collects on the back or exterior side of the cooled, vapor barrier wall covering and causes mold, mildew, and other degradation processes and fungi growth on or within the wall. These adverse reactions to the high humidity accelerate the failure of the wall covering product, degradation or destruction of the wall beneath, noticeable and offensive odors, all at great expense to owners of, for example, large commercial buildings in these geographic regions. Mold, mildew and musty odors cost the American hotel and motel industry over $70 million every year in lost revenue and repair costs.

Mold and mildew are fungi and over 90% of them have airborne spores. Fungal growth requires four elements: spores, temperature, food and moisture. Stopping mildew growth requires elimination of one or more of these essential elements. As a practical matter, spores are always present and virtually impossible to eliminate in most buildings. Temperature ideal for fungal growth is always available in buildings since mold and mildew prefer the range of temperatures comfortable to humans. Fungal nutrients are always available in some form since fungi can feed on virtually any organic material. Thus, removing moisture is the most practical method of controlling fungal growth.

The amount of moisture needed to support fungal growth depends on the type of material available as a food source. For instance, wall paper pastes based on corn starch or wheat starch with a moisture content above 15% of its dry weight becomes a very favorable environment for mold growth. In contrast, most types of wallboard must absorb over 30% of their dry weight in water before they will support mold growth. Relative humidities of 50% to 75% or above are frequently seen in, for example, southeastern United States.

It would therefore be desirable to have a strong and breathable plastic wall covering product which eliminates condensation and trapped moisture and allows the penetration of exterior humid air through the wall covering and into a room where the moist air can be dehumidified by the dehumidifier and/or air conditioner.

BRIEF DESCRIPTION OF THE INVENTION

Broadly, the invention is directed to permeable plastic films. One object of the present invention is to provide a novel composition comprising a plastic, a plasticizer, and a low-boiling additive, or a latent gas generator.

Another object of the present invention is to provide a permeable wall covering product.

Yet another object of the present invention is a novel process for preparing a wall covering product. Still another object is to provide a permeable or semi-permeable film useful in filtration to separate components, such as particles.

More specifically, the invention relates to a novel porous, permeable or breathable wall covering product comprising a plastic film. The invention also relates to a novel process for preparing the breathable wall covering product.

It has been surprisingly discovered that the addition of a low boiling additive, such as water, to a plastisol can result in the formation of microscopic or macroscopic holes in a film made from the plastisol. The resulting film is useful as a moisture vapor permeable wall covering product with particular advantages in geographic areas of high relative humidity.

Another use for the permeable films of the present invention is in filtration or separation technologies, wherein a plastic film with microscopic or macroscopic holes is used to retain or separate components in a fluid (such as air or liquids) or finely divided solid materials.

Yet another use of the films of the present invention is for sound absorption. The high porosity of the films creates a sound absorbing, high surface area material which when used in single or multiple ply laminates will reduce sound transmission. Thus, when incorporated into a wall covering product, the films of the present invention can impart sound deadening or dampening between rooms covered with said wall covering product.

The films of the present invention can be produced with various hole sizes and hole distribution or density by (1) varying the concentration of the low-boiling additive in the plastisol which is added to a plastic, (2) varying the volatilization rate by which said additive leaves the curing plastic, (3) applying multiple coatings of the plastisol onto a backing or substrate.

DETAILED DESCRIPTION OF THE INVENTION

By "breathable", "permeable" or "porous" herein is meant permeable or semipermeable, including but not limited to the ability to transmit moisture vapor in the air. Also included is the ability or character to selectively transmit, conduct, or transport gases, mists and vapors of chemicals, and mixtures thereof. Also included is the ability or character to provide selective permeation, such as in filtration or separation. Also included is the ability to filter or otherwise separate finely divided materials, such as solids, smoke, dust, sediment, and the like.

By "plastic" herein is meant any curable or crosslinkable polymer, copolymer, blend, and the like, of preferably organic film formers. The plastic can be present as a monomer, dimer, oliqomer, polymer or copolymer or the like, or mixtures thereof. Such materials can include, for example, and not by way of limitation, thermosetting and thermoplastic materials such as polyvinyl chloride, polyesters, polyimides, polyamides, nylon, polysulfones, polyethylene, polypropylene, polystyrene, polymethylstyrene, polyethylene terephthalate, polyisoprene, polyvinyl acetate, polyvinylidene chloride, polyvinylidene fluoride, silicone resins, styrene-acrylonitrile copolymer resins, aliphatic urethane acrylate oligomers, polyacrylates, polymethacrylates, isobornyl acrylate, polymethylmethacrylates, diol diacrylates, styrene-butadiene copolymers, polycarbonates, polycaprolactams, natural rubber latex, and blends thereof and coextrusions thereof. Other film forming materials will be obvious to those skilled in the art and are intended to be covered in the scope of the compositions, articles, and processes of the present invention. Examples of commercially available polyvinyl chloride resins include, but are not limited to, Huls E7012; Corvic P67/579; Lucovyl 1202; Vestolit E7012; Oxy Chem Resins 675F, 1755, 625, 626P, 1716, 1732 and 1730; and Pevikon PE709.

Vestolit E 7012 is a very common PVC resin for blown vinyl wall coverings which is useful as the plastic in the present invention.

If the curable plastic used in the present invention is an ultraviolet radiation photocurable plastic, a preferred plastic composition comprises (A) from about 20 percent to about 80 percent by weight of an acrylate urethane oligomer which is the reaction product of (i) a hydrocarbon polyol; (ii) an aliphatic polyisocyanate; and (iii) an endcapping monomer selected from hydroxyalkylacrylate and hydroxyalkylmethacrylate;

(B) from about 5 percent to about 50 percent by weight of an alkyl acrylate or methacrylate monomer having between 6 and 18 carbon atoms in the alkyl moiety;

(C) from about 5 percent to about 60 percent by weight of a monomer or oligomer having (1) an aromatic moiety, (2) a moiety containing acrylic or methacrylic unsaturation, and (3) a hydrocarbon moiety;

(D) from zero percent to about 3.0 percent by weight of an organofunctional silane adhesion promoter; and (E) from about 1.0 percent to about 10 percent by weight of a photoinitiator, all of the above stated percentages by weight for the primary coating being based on the total weight of (A), (B), (C), (D) and (E).

Another ultraviolet curable plastic composition comprises (1) from about 20 percent to about 80 percent by weight of an aliphatic urethane acrylate oligomer based on a polyester;

(2) from about 20 percent to about 60 percent by weight of an acrylated or methacrylated compound selected from the group consisting of isobornyl acrylate; isobornyl methacrylate; $C_6$ to $C_{16}$ saturated hydrocarbon diol diacrylates; $C_6$ to $C_{16}$ saturated hydrocarbon diol dimethacrylates; and mixtures thereof;

(3) from about 1 percent to about 10 percent by weight of a photoinitiator, all of the stated percentages by weight for the plastic composition being based upon the total weight of (1), (2) and (3).

The photoinitiator, used in a small but effective amount to promote radiation cure, must provide reasonable cure speed without causing premature gelation or cure of the composition. Suitable photoinitiators include the following hydroxycyclohexylphenyl ketone; hydroxymethylphenylpropanone; dimethoxyphenylacetophenone; 2-methyl-1-[4-(methylthio)-phenyl]-2-morpholino-propanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-(2-hydroxy-2-propyl)ketone; diethoxyacetophenone; 2,2-di-sec-butoxyacetophenone; diethoxyphenyl acetophenone; and mixtures of these. Preferably, the amount of photoinitiator is from 1.5 percent to about 8.0 percent, and more preferably about 2.0 percent to about 7.0 percent by weight, based upon total plastic weight. A particularly preferred photoinitiator is hydroxycyclohexylphenyl ketone. The photoinitiator should be chosen to be compatible with the other components, and such that a cure speed will facilitate the volatilization of the low boiling additive which is combined with the photocurable plastic composition.

By "plasticizer" herein is meant any material or materials added to a plastic, as defined hereinabove, to facilitate compounding, or improve flexibility, or impart other desired properties to the finished product. Such materials can be, but are not limited to, nonvolatile organic liquids, low melting organic solids, such as, for example, the phthalate, adipate, trimellitate, sebacate esters, epoxidized soybean oil (ESO), acetates, azelates, glutamates, tallates, and other aliphatic esters and aryl phosphate and other aromatic or alkyl-aromatic esters and mixtures thereof. Specific plasticizers useful in the present invention can include, and not by limitation, di-2-ethylhexyl phthalate (also known as dioctyl phthalate, hereinafter "DOP"); dibutyl phthalate ("DBP"); butyl benzyl phthalate ("BBP", available commercially from Monsanto as Santicizer® 160); alkyl benzyl phthalates ("ABP", available from Monsanto as Santicizer® 261 or Santicizer® 278); dioctyl adipate or di(2-ethylhexyl) adipate also known as "DOA"; dialkyl adipate (Monsanto Santicizer® 97); 2-ethylhexyl diphenyl phosphate (Monsanto Santicizer® 141); isodecyl diphenyl phosphate (Monsanto Santicizer® 148); t-butylphenyl diphenyl phosphate (Monsanto Santicizer® 154); triphenyl phosphate; hydrogenated terphenyl; mixed alkyl phthalate esters where the alkyl group can be $C_7$, $C_9$, or $C_{11}$, such as Monsanto's Santicizer 711 or Exxon's Jayfex 9711 or Aristech's PX-139; diisooctyl phthalate ("DIOP"); diisoheptyl phthalate ("DIHP"); diisononyl phthalate ("DINP"); diisodecyl phthalate ("DIDP"); isononyl alcohol ("INA"); diisotridecyl phthalate ("DTDP"); dihexyl phthalate ("DHP"); dilinearundecyl phthalate ("DUP"); tri-2-ethylhexyl trimellitate; triisononyl trimellitate ("TINTM"); trioctyl trimellitate ("TOTM"); adipates (available as PLASTHALL from The C. P. Hall Company); N,N-dimethyl caprylamide capramide (HALLCOMID® M-8-10 from The C. P. Hall Company); N,N-dimethyl oleamide (HALLCOMID® M-18-OL); stearic acid ester amide; dibenzyl azelate (PLASTHALL DBZZ); dibutoxyethyl azelate; diisobutyl azelate; dioctyl azelate; alkyl and alkoxy glutarates; polyethylene glycol laurates; polyoxyethylene laurates; alkyl and alkoxy oleates; and the like, and combinations thereof. Preferred plasticizers include DOP, DOA, DIOP (also known as DOIP) and DINP. Other materials known as plasticizers to those skilled in the art are also contemplated herein, including, for example, nonesters such as glycols, amides, sulfonates, and polyethers. The plasticizer can be added to the plastic in varying amounts depending on the nature of the plastic, the nature of the plasticizer, and the desired final properties. Generally, from 1% to 50% by weight and more preferably 20% to 50% by weight plasticizer is added to the plastic. Some plasticizers are known to also provide biocidal activity which is useful in the present invention. These can include, for example, OBPA (oxybisphenoxyarsine) from Morton International and Akzo; Polyphase AF-1(3-iodo-Zpropynlbutylcarbamate) from Troy Chemical; Fungitrol II (N-trichloromethylthiophthalimide) from Huls America; IT3000 (2-n-octyl-4-isothiazoline-3-one) from Morton International; and MicroChek II (2-n-octyl-4-isothiazoline-3-one) from Ferro Corporation.

By "plastisol" herein is meant any dispersion, emulsion, suspension, or mixture of the aforementioned plastic and plasticizer. The plastisol can be 100% solid with initially no volatiles, yet still be a liquid dispersion. If the volatiles content exceeds 5% of the total weight, the composition is commonly called an organosol, but shall still be regarded as a plastisol within this invention. Conventionally, when the plastisol and plasticizer mixture is heated, the plasticizer solvates the plastic droplets or particles, and the mass gels, also referred to herein as curing or fusing. Commercial plastisols can include, but are not limited to, Borden PV-222; Borden PV 238-090; Pan PL90-90A; and Brant Coatings R-880.

By "additive" or "low boiling additive" herein is meant a material which, when mixed with the plastisol and this mixture is heated, will volatilize out from the mixture. Thus, for example, a preferred additive herein is water, but can also be a low boiling organic liquid, or a latent gas generator, such as, for example, a liquid or solid material which will liberate a vapor or blowing agent such as water vapor, nitrogen gas, hydrogen gas, oxygen gas, carbon monoxide gas, or carbon dioxide gas during the extruding and/or curing of the plastic film. Additives useful in the present invention can include, and not by limitation, water, $C_1-C_{10}$ alcohols, $C_1-C_{10}$ ethers, crown ethers, cyclic $Si_4-Si_8$ siloxanes, linear siloxanes, $C_1-C_{10}$ aldehydes, $C_1-C_{10}$ esters, $C_1-C_{10}$ ketones, hydrated silica gels and mixtures thereof. Additional additives useful herein are materials known as blowing agents, such as but not limited to, azodicarbonamide (Celogen AZ); p-toluene sulfonyl semicarbazide (Celogen RA); and p,p-oxybis benzene sulfonyl hydrazide. Latent gas generators and known blowing or foaming agents are also useful in the present invention if they serve to perforate the forming plastic film or coating. Particularly preferred blowing or foaming agents are those which create open cells in the foam, since closed cells would not significantly increase the permeability of the resulting film. However, closed cell blowing or foaming agents used in conjunction with known surface tension reducers are operative additives herein. Fast curing plastics and/or the use of an additive or additives which are slow to volatilize can lead to thin film foams as the plastic cures before all the volatilized additive escapes. The additive of choice should have a boiling point below the boiling point of the plastisol or components thereof. Preferred additive boiling points are between 30° and 120° C. Mixtures of additives are also within the scope of the present invention to achieve a wider temperature range over which volatilization and perforation of the film occurs.

By "extruded" herein is meant broadly any technique for forming a film, or coating a film onto a substrate, including but not limited to, extrusion, co-extrusion, 2-roll milling, 3-roll milling, knife coating, air knife, knife over roll, rotary screen coating, pressing, sheeting, calendering, direct and reverse gravure, offset gravure, knife-over-roll, metering rod, 2 roll kiss, dip coat, spray coating, casting, coating and the like. The extruded film or coated substrate of the present invention can be cut, shaped, stamped, inked, printed, folded, or made into multi-ply laminates. Glues, pressure sensitive adhesives, pastes and the like can be applied to the film or coated substrate.

By "film" herein is meant a free-standing polymeric sheet, film, ribbon and the like, as well as a coating on a substrate, and also laminates and composite articles, including but not limited to multi-ply laminates and "sandwich" composite articles. Also included as "film" herein is a skin or membranous covering.

In a preferred embodiment, a plastisol containing the low boiling additive is applied by a blade or roller to the interior surface of a rotating perforated drum, whereby the plastisol is forced through the perforations and onto the exterior of the drum over which a substrate such as paper is being drawn. The substrate contacts the plastisol which is absorbed onto or into the substrate which is then exposed to heat sufficient to volatilize the low boiling additive and cure the plastisol into a porous plastic film-coated substrate.

Thus, one embodiment of the present invention provides a porous or permeable plastic film prepared by a process comprising:

(1) combining a curable plastic and a plasticizer to form a plastisol;

(2) combining with the plastisol an additive with a boiling point below the boiling point of the plastisol;

(3) extruding the mixture from step (2) to form a film;

(4) curing the film under conditions causing the additive to volatilize through the cured or curing film to thereby leave a multiplicity of holes in the resulting plastic film.

The invention also relates to the product produced by this process.

By "curing" herein is meant curing, crosslinking, setting, reacting, chain extending, molecular weight advancing and the like whereby the plastic monomer, dimer, oligomer, polymer or copolymer becomes a free standing and non-reactive film or a coating on a substrate. Curing can be achieved according to the present invention by thermal exposure, chemical catalysis, ultraviolet irradiation or other photochemical exposure, electron beam irradiation, and other known crosslinking or chain extending technologies for film formation. Curing can also be achieved by a combination of conditions, such as combining ultraviolet or election beam irradiation with a thermal curing oven or gaseous chemical vapor catalysis. The critical feature of the curing system utilized is the ability to balance the cure rate of the plastic with the volatilization rate of the low boiling additive. Thus, depending on the plastic composition chosen, the preferred cure mechanism is chosen which will allow the evaporation or volatilization of the additive during the cure such that the desired perforation is achieved.

When a heated air dryer or drying oven is used alone or in conjunction with another cure-initiating system, several drying chambers are useful. Such basic dryers are well known to those in the printing and converting art, and include, for example, horizontal and vertical air flow designs. In the horizontal air flow type dryer, the air is forced out of nozzles in a path which is essentially parallel to the web. The vertical, or impingement, air flow dryer forces air out of slots which make it hit the wet layer at right angles to movement of the web. One-side and two-side impingement dryers are both useful herein.

According to the present invention, drying conditions slightly different from conventional conditions may be preferred. For example, conventional converters use lower (33-50%) efficiencies in drying to produce a slow dry. Fast drying can force diluents out of the wet layer at a rate which conventionally creates quality problems (pinholes), but by the present invention, surprisingly produces the desired perforation. The water vapor is forced out of the semi-dry semi-cured plastisol layer with high amounts of energy (heat, air velocity, air volume), causing the surface skin to rupture. These pin-holes can reseal themselves if the material is thermoplastic or not sufficiently cured but preferably herein the holes remain open. In addition to higher air volumes and faster drying, drying temperatures higher than conventional temperatures may also be used in the present invention. It is well known that the higher the temperature of the air hitting the sheet or web passing through a dryer, the more diluent or low boiling additive that will be evaporated. High temperatures also favor pin-holing, which is normally avoided but desired herein.

In another embodiment, the plastisol/additive mixture is coated onto a substrate prior to the cure of the curable plastic. Coating can be achieved by any of the many techniques known in the art, such as but not limited to direct and reverse gravure meter, two roll kiss, knife-over-roll, dip coating, spray coating, etc. Many forms of coating technique are known and all are applicable herein. This forms a coated substrate in which, upon curing as described hereinabove, the coating has a plurality or multiplicity of randomly distributed holes. The substrate can be, for example, paper, cardboard, fiberglass, felt, cellulosic fiberboard, cloth or other porous or perforated material, and such porous, permeable or perforated materials are well known in the wall covering industry. In this manner, a moisture-breathable wall covering product is produced. The cloth substrate can be, for example, a fabric comprising cotton, polyester, cellulose, fiberglass, natural or synthetic polyolefin or other fibrous woven, non-woven, or matted material, or mixtures thereof. Multiple coatings onto the substrate can reduce the resulting porosity and permeability to a desired level.

Thus, in another embodiment is provided a process for preparing a porous plastic film-coated substrate comprising the steps:

(1) combining a curable plastic and a plasticizer to form a plastisol;

(2) combining with the plastisol an additive with a boiling point below the boiling point of the plastisol;

(3) extruding, coating or otherwise applying the mixture from step (2) onto a substrate;

(4) curing the coating from step (3) under conditions whereby the additive volatilizes through the cured or curing coating to thereby leave a multiplicity of holes in the resulting plastic film-coated substrate.

The invention also relates to the product produced by this coating process.

In the process and product of the present invention, a preferred plastic is polyvinyl chloride, and a preferred plasticizer is n-dioctyl phthalate (DINP).

A more fully formulated plastisol has the following composition:

|  | Parts per hundred |
|---|---|
| polyvinyl chloride resin | 100 |
| DINP plasticizer | 30-70 |
| epoxidized soybean oil stabilizer | 3-5 |
| zinc octoate | 2.5 |
| blowing agent (water) | 8 |
| titanium dioxide | 7 |
| calcium carbonate | 43 |
| mineral spirits | 5 |

A flat plastisol vinyl ink formulation can, for example, have the following composition:

|  | parts per hundred |
|---|---|
| polyvinyl chloride resin | 100 |
| DINP plasticizer | 50 to 60 |
| epoxidized soybean oil stabilizer, dioctyl adipate | 3-5 |
| titanium dioxide | (as required) |
| calcium carbonate | " |
| mineral spirits | " |
| | 5 to 10 |

A blowing agent, such as azodicarbonamide, can also be added.

A preferred vinyl resin plastisol formulation useful in producing a smooth, medium expansion product by the screen print process comprises:

|  | parts by weight |
|---|---|
| DOA plasticizer, Jaflex 7511 from Exxon | 17.86 |
| Flame retardant (Sb$_2$O$_5$/barium metaborate) plasticizer | 5.26 |
| Ba/Zn stabilizer, Witco 4753 | 0.22 |
| Surfactant, Igepal 660 | 0.85 |
| PVC/PVAC resin Formolon 40, Formosa | 10.5 |
| Vinyl resin VC 410M Borden | 31.53 |
| Mineral spirits, Unocal or Ashland | 1.04 |
| Colorant (plasticizer, ESO, TiO$_2$) | 21.46 |
| Polyphase AFI non-arsenic biocide or OBPA | 0.17 |
| Water | 11.1 |

The mixing of the components is preferably accomplished by first combining the PVC plastic and DINP, DOA or other plasticizer at room temperature (e.g., 25° C.) with stirring to form the plastisol. Adding the water with further stirring produces the hydrated plastisol. Such a hydrated plastisol formulation is room temperature stable for at least several days and exhibits a viscosity of approximately 2000 to 3000 cps, however, these are not limitations herein. A preferred additive is water, whereby the resulting hydrated plastisol has the following composition range:

|  | Weight % |
|---|---|
| polyvinyl chloride | 35 to 60 |
| DOP or DINP | 20 to 50 |
| water | 10 to 20 |

The weight percentage of low boiling additive, such as water, in the plastisol can vary from about 0.5% to preferably about 20% by weight. Amounts of additive or additives beyond 20% total by weight in the plastisol are also operative herein and are not excluded from the invention at any level if the result of extrusion and curing of a curable plastic is a film with a multiplicity of holes. Levels of low boiling additive above 20% by weight in the plastisol are more difficult to maintain in uniformly homogeneous dispersion, however, emulsifiers and surfactants can be used to increase the stability of additive/plastisol mixtures. Emulsifiers and surfactants are well known to those skilled in the art of plastic and film extrusions, and will not be discussed here. When the additive is water, a preferred level of water in the hydrated plastisol is about 15 weight percent.

The hydrated plastisol is then extruded as a freestanding film, or is coated onto a substrate in a manner much like conventional vinyl film extrusion. Upon coating or extrusion, the vinyl or other plastic component cures or fuses, and this process or a subsequent exposure to a curing oven or photo irradiation unit, results in the evaporation, boiling or volatilization of the additive which "pops" or "blows" out from or through the developing film surface. This out-gassing step leaves holes in the resulting film of a size and distribution related to the additive concentration in the plastisol, the temperatures of the extrusion and curing, and the rate of volatilization of the additive. These parameters can be varied by the skilled artisan to obtain the desired film porosity. Higher concentrations of additive in the plastisol tend to increase the density of the resulting holes and distributions of from about zero to thousands of holes (e.g., 3,000 to 5,000) per square centimeter are readily obtained from additive concentrations of from about 0.5 to 20 weight percent in the plastisol. The holes can range in size up to a size which would be undesirable as a visual surface of a wall covering product. Holes up to at least 40 microns are generally acceptable.

In another embodiment of the present invention, the low boiling additive is water present in the form of hydrated silica gel. The hydrated silica gel is added to the curable plastic, with an optional plasticizer, and the mixture is extruded or coated onto a substrate and cured. As the water is evaporated, the silica residue remains embedded in the resulting cured plastic film.

Permeability

There are three terms commonly used to characterize water vapor flow through various materials; i.e., water vapor transmission (WVT), permeance, and permeability. WVT is the flow rate of water vapor measured in unit of time through a unit area, or grains/(hour$\times$foot$^2$). Permeance is time rate of water vapor transmission through a unit area of material. This is generally a performance value (1 Perm), rather than a property. Permeability is the arithmetic product of permeance and thickness, i.e., it is a time rate of water vapor transmission through a unit area of a unit thickness (1 Perm Inch). WVT is usually associated with packaging materials, while permeability is used with raw materials. Permeance is more related to finished products and for wall covering the permeance value is the more appropriate measurement.

ASTM Standard Test Method E96 covers the determination of water vapor transmission of materials through which the passage of water vapor may be of importance. Two methods are provided in ASTM E96; the Desiccant Method and the Water Method. In the Desiccant Method, the test specimen is sealed to the open mouth of a test dish containing a desiccant, and the assembly placed in a controlled atmosphere. Periodic weighings determine the rate of water vapor movement through the specimen into the desiccant.

In the Water Method, the dish contains distilled water, and the weighings determine the rate of vapor movement through the specimen from the water to the controlled atmosphere.

$$WVT \text{ per day} = G \times 24 \div (t \times A)$$

where G=weight change in grams (g), t=time in hours; G/t=slope of the straight line g·h$^{-1}$·m$^2$; A=test area, m$^2$; and WVT=rate of water vapor transmission, g·h$^{-1}$·m$^2$.

Permeance=WVT/ p=WVT/S ($R_1-R_2$) where p=vapor pressure difference, mmHg; S=saturation vapor pressure at test temperature, mmHg; $R_1$32 relative humidity at the source expressed as a fraction (the test chamber for the desiccant method, and in the dish for the water method); $R_2$=relative humidity at the vapor sink expressed as a fraction.

The following examples are meant to illustrate certain embodiments of the invention without any limitation or exclusion.

Example I

"Vinyl Coated on Thin Paper Substrate

A vinyl plastisol formulation was prepared containing polyvinylchloride resin (Diamond PVC 7401), 21.5 weight percent di-octyl phthalate plasticizer available from Monsanto and 11% by weight water. A tint (red dye, from Poly-tex) was added (less than 1% by weight) with blending so coating uniformity could be observed. The tinted plastisol, having a viscosity of 2000 cps was applied to thin non-woven paper weighing less than 2 ounces per square yard obtained from Dexter (9695 Dexter paper). The paper width was 43½ inches and the line speed was 20 yards per minute. The application technique was rotary screen with a squeegee blade and the coating weight was about 6 ounces per square yard. The screen gap between the screen and the squeegee blade was 0.006 inch. The paper coated with the plastisol came off the rotary screen and entered a hood oven which was maintained at 350° F. The residence or dwell time of the coated paper in the hood oven was 60 seconds to gel or cure the initial coating. During the exposure in the hood, the water in the plastisol evaporated as the vinyl gelled to produce a perforated coating on the paper. A final print coating was applied by a second pass, but instead of the plastisol, a heat curable water borne vinyl plastisol ink (as described above) was applied through a conventional printer and the coated substrate was passed into the 350° F hood.

The resulting wall covering product had acceptable weight, flexibility, color, printability, and cohesion. The Perm value using the Desiccant Method was 7.9 and 10.5 using the Water Method, indicative of good water vapor permeability. Conventional vinyl wall covering products produced by a similar procedure but without the low boiling additive water have a Perm value of essentially zero.

Example II

Vinyl Composition Double Coated on Thick Paper Substrate

Using the procedure described in Example I, a tinted PVC plastisol formulation was prepared from PVC resin VC410 (Columbus Coated Fabrics, division of Borden, Inc.) and applied to a thick nonwoven paper weighing 2.25 ounces/square yard from Dexter (10108T). The thicker paper tends to soak up the coating more so than the thinner paper used in Example I.

The line speed was maintained at 20 yards per minute but the hood temperature was reduced to 270° F. The plastic coated paper which emerged from the hood oven was then put through a second coating station using the same plastisol formulation, but with a viscosity of 3000 cps. Using another rotary screen printer and a squeegee blade set at 0.006 inch and a hood temperature of 350° F, the second pass was completed. A final print coat was applied as in Example I. The total coating weight was 9.7 ounces/square yard.

The resulting wall covering product had a Perm value of 6.0 using the Desiccant Method and approximately 4.0 for the Water Method. The lower Perm values relative to those obtained in Example I reflect the decreased porosity attained by the second coating pass.

Example III

Photocurable Plastic

In another embodiment of the present invention, an ultraviolet radiation curable polyester resin containing photoactive acrylate functionalities can be combined with a photoinitiator (which are known to those skilled in the art), a plasticizer (20–25% by weight) and 10 percent by weight water. The mixture can be spray coated, or applied by a blade coater to a cloth or paper substrate (which can be pre-heated) and then irradiated by ultraviolet radiation of sufficient wave length, duration, and intensity to photo cure the resin. If the substrate is not hot enough to drive off the water during the photocure, additional heating can be supplied by passing the coated substrate over a heated drum roller or by blowing hot air over the surface of the coated substrate to facilitate volatilization of the water. In this manner will be produced a breathable polyester-coated cloth or paper.

In general, the films and wall covering products produced by the process of the present invention exhibit Perm values of from about 1.0 to about 20.0 using the Desiccant Method, and/or Perm values of from about 2.0 to about 18.0 using the Water Method. The higher the Perm value is, the more breathable is the product.

More specifically, water vapor transmission tests (using the Water Method) were performed on four coated substrates to calculate Perm values. Table I shows the values for WVT and Perms over 216 hours for these four coated substrates. Sample A was a substrate of appertured non-woven rough weave cellulose substrate about 2.2 ounces per square yard (Dexter 10108T) with one coating of the vinyl plastisol coating of Example II applied at a cured coating weight of about 6 ounces per square yard. (This was then embossed, but embossing tends to close some of the holes.) Sample B was a thinner cellulose fiber paper (Dexter 9695) weighing about 1.5 ounces per square yard which was coated with two coatings (2 ounces and 6 ounces) of the vinyl plastisol coating of Example I for a total cured coating weight of about 8 ounces per square yard. The coated paper was then embossed. Sample C was the non-woven cellulose substrate of Sample A but with about 8 ounces per square yard of cured vinyl plastisol coating (i.e., two coats) of Example I. Sample D was a cellulose paper with about 8 ounce/square yard coating weight of cured coating from the vinyl plastisol of Example I.

TABLE I

|  | 5 hr | | 23 hr | | 45 hr | | 117 hr | | Final 216 hrs | |
|---|---|---|---|---|---|---|---|---|---|---|
|  | WVT | Perm | WVT | Perm | WVT | Perm | WVT | Perm | WVT | Perm |
| Sample A | 667 | 17.3 | 498 | 12.9 | 451 | 11.7 | 407 | 10.5 | 400 | 10.4 |
| Sample B | 112 | 2.9 | 125 | 3.2 | 124 | 3.2 | 120 | 3.1 | 124 | 3.2 |
| Sample C | 109 | 2.8 | 141 | 3.6 | 147 | 3.8 | 150 | 3.9 | 149 | 3.9 |
| Sample D | 241 | 6.2 | 262 | 6.8 | 256 | 6.6 | 247 | 6.4 | 249 | 6.4 |

(Each number in Table I represents a value derived by averaging the results from 5 specimens.)

Table I indicates that very good Perm values are obtained by the present invention. Since conventional vinyl wall covering has a Perm value of zero, or essentially zero, it is clear that initial average Perm values of 17.3 for Sample A (including a 19.5 and 17.4) and subsequent values from about 3 to over 10 are readily achieved. In fact, if Sample A had been unembossed the Perm value would be even higher, since embossing tends to cause the coating to flow and close some of the holes. Wall covering product produced from material such as Samples A through D will exhibit water vapor transmission in geographic areas of high relative humidity sufficient to significantly reduce moisture build-up in the wall due to condensation.

The porous films of the present invention are useful for preparing moisture vapor-permeable wall coverings, and also filters for separating particles in fluids, such as liquids and air. These filters can be free-standing membranes or a component within composite filtration laminates or similar articles.

The permeable plastic films of the present invention can also be adhesively applied to the walls of a room to thereby reduce the sound transmission from the room through the walls.

While the foregoing examples utilized vinyl polymers as the curable plastic in the plastisol, other curable plastics discussed hereinabove are also useful. Other curable plastics can be substituted in the plastisol formulation to replace or complement the vinyl polymer. Thus, for example, any organic film former which can have holes blown through the curing plastic by the evolution of the vaporizing low boiling additive are useful herein. Plastisols comprising a polyester, a rubber or polyolefin plus a low boiling additive such as water should therefore be produced by the method described herein, and produce upon cure a breathable plastic film or breathable plastic coating on a substrate. Those skilled in the art can select an appropriate plasticizer to use with each plastic or combination of plastics.

That which is claimed is:

1. A permeable plastic film prepared by a process comprising:
   (1) combining a curable plastic and a plasticizer to form a plastisol;
   (2) combining with the plastisol an additive with a boiling point below the boiling point of the plastisol;
   (3) extruding the mixture from step (2) to form a film;
   (4) curing the film from step (3) under conditions whereby the additive volatilizes through the cured or curing film to thereby leave a multiplicity of holes in the resulting plastic film.

2. The plastic film of claim 1 wherein the curable plastic is selected from the group consisting of polyvinyl chloride, polyesters, polyethylene terephthalate, polyvinyl acetate, polyvinylidene chloride, polyvinylidene fluoride, and blends thereof and coextrusions thereof.

3. The plastic film of claim 1 wherein the curable plastic is selected from the group consisting of polyimides, polyamides, nylon, and polysulfone.

4. The plastic film of claim 1 wherein the curable plastic is selected from the group consisting of polyethylene, polypropylene, polystyrene, polymethylstyrene, polyisoprene, and styrene-acrylonitrile copolymer resins.

5. The plastic film of claim 1 wherein the curable plastic is selected from the group consisting of silicone resins, polycarbonates, styrene-butadiene copolymers, polycaprolactams, and natural rubber latex.

6. The plastic film of claim 1 wherein the curable plastic is selected from the group consisting of aliphatic urethane acrylate oligomers, polyacrylates, polymethacrylates, isobornyl acrylate, polymethylmethacrylates, and diol diacrylates.

7. The plastic film of claim 1 wherein the curable plastic comprises polyvinyl chloride.

8. The plastic film of claim 1 wherein the plasticizer is selected from the group consisting of phthalate esters, adipate esters, trimellitate esters, sebacate esters, azelates, glutamates, tallates, laurates, acetates, and aryl phosphate esters.

9. The plastic film of claim 1 wherein the plasticizer is selected from the group consisting of glycols, epoxidized soybean oil, polyethers, and amides.

10. The plastic film of claim 1 wherein the plasticizer comprises n-dioctyl phthalate.

11. The plastic film of claim 1 wherein the plasticizer is present in the plastisol at a level of from 1 to about 50 weight percent.

12. The plastic film of claim 1 wherein the additive is water and is present in the plastisol at 5% to 20% by weight.

13. The plastic film of claim 1 wherein the additive is present in the plastisol at a level of from about 1 to 30% by weight and is selected from the group consisting of water, $C_1$–$C_{10}$ alcohols, $C_1$–$C_{10}$ ethers, crown ethers, cyclic $Si_4$–$Si_8$ siloxanes, linear Siloxanes, $C_1$–$C_{10}$ aldehydes, $C_1$–$C_{10}$ esters, $C_1$–$C_{10}$ ketones, and mixtures thereof.

14. The plastic film of claim 1 wherein the additive is present in the plastisol at a level of from about 1 to 30% by weight and is selected from latent gas generators and hydrated silica gel.

15. The plastic film of claim 14 wherein the latent gas generator generates a gas selected from the group consisting of hydrogen, oxygen, nitrogen, carbon dioxide, carbon monoxide and water vapor.

16. The plastic film of claim 15 wherein the latent gas generator is selected from the group consisting of azodicarbonamide, p-toluene sulfonyl semicarbazide, and p,p-oxybis benzene sulfonyl hydrazide.

17. The plastic film of claim 1 wherein the boiling point of the additive is between 30° and 120° C.

18. The plastic film of claim 1 wherein the mixture in step (3) is extruded onto a substrate, and subsequently cured to form a composite article which exhibits a Perm value of from 1.0 to 20.0 by the Desiccant Method, or a Perm value of from 2.0 to about 18.0 by the Water Method.

19. The plastic film of claim 18 wherein the substrate is a fabric selected from the group consisting of cotton, polyester, cellulose, felt, fiberglass and polyolefin.

20. The plastic film of claim 18 wherein the substrate is paper.

21. The plastic film of claim 18 wherein the substrate is polyvinyl chloride.

22. The plastic film of claim 1 wherein the film is thermally curable and is cured in step (4) by exposure to thermal conditions sufficient to volatilize the additive and initiate crosslinking of the plastic comprising the film.

23. The plastic film of claim 1 wherein the plastic is ultraviolet radiation curable and wherein the composition further comprises a photoinitiator, and is cured in step (4) by exposure to sufficient ultraviolet radiation.

24. The plastic film of claim 23 wherein the photoinitiator is selected from the group consisting of hydroxycyclohexylphenyl ketone; hydroxymethylphenylpropanone; dimethoxyphenylacetophenone; 2-methyl-l-[4-(methylthio)phenyl]-2-morpholino-propanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-(2-hydroxy-2-propyl)ketone; diethoxyacetophenone; 2,2-di-sec-butoxyacetophenone; diethoxyphenyl acetophenone; and mixtures of these.

25. The plastic film of claim 1 wherein the plastic is electron beam radiation-curable and sufficient electron beam radiation is applied to cure the film and volatilize the additive to produce a porous film.

26. The porous plastic film of claim 11 wherein the plastic is polyvinyl chloride, the plasticizer is n-dioctyl phthalate, the additive is water, and wherein the plastic is present in the plastisol at from 30 to 50 weight percent, and the plasticizer is present in the plastisol at from 20 to 40 weight percent, and the additive is present in the plastisol at about fifteen weight percent, and wherein the substrate is paper, and the curing is achieved by exposing the coated substrate to a temperature range of from 120° to 150° C., and wherein the resulting cured film has holes up to 40 microns in diameter, and wherein the holes are present at a density of 1 to about 5,000 holes per square centimeter.

27. A process for preparing a permeable plastic film comprising the steps:
(1) combining a curable plastic and a plasticizer to form a plastisol;
(2) combining with the plastisol an additive with a boiling point below the boiling point of the plastisol;
(3) extruding the mixture from step (2) to form a film;
(4) curing the film from step (3) under conditions whereby the additive volatilizes through the cured or curing film to thereby leave a multiplicity of holes in the resulting plastic film.

28. The process of claim 27 wherein the plastic is selected from the group consisting of polyvinyl chloride, polyesters, polyethylene terephthalate, polyvinyl acetate, polyvinylidene chloride, polyvinylidene fluoride, and blends thereof and coextrusions thereof.

29. The process of claim 27 wherein the plastic is selected from the group consisting of polyimides, polyamides, nylon, and polysulfone.

30. The process of claim 27 wherein the plastic is selected from the group consisting of polyethylene, polypropylene, polystyrene, polymethylstyrene, polyisoprene, and styrene-acrylonitrile copolymer resins.

31. The process of claim 27 wherein the plastic is selected from the group consisting of silicone resins, polycarbonates, styrene-butadiene copolymers, polycaprolactams, and natural rubber latex.

32. The process of claim 27 wherein the plastic is selected from the group consisting of aliphatic urethane acrylate oligomers, polyacrylates, polymethacrylates, isobornyl acrylate, polymethylmethacrylates, and diol diacrylates.

33. The process of claim 27 wherein the plastic comprises polyvinyl chloride.

34. The process of claim 27 wherein the plasticizer is selected from the group consisting of phthalate esters, adipate esters, trimellitate esters, sebacate esters, glutamates, tallates, laurates, acetates, azelates, glutarates, and aryl phosphate esters.

35. The process of claim 27 wherein the plasticizer is selected from the group consisting of epoxidized soybean oil, amides, glycols, and polyethers.

36. The process of claim 27 wherein the plasticizer comprises n-dioctyl phthalate.

37. The process of claim 27 wherein the plasticizer is present in the plastisol at a level of 20 to 50 weight percent.

38. The process of claim 27 wherein, the additive is water and is present in the plastisol at a level of from about 5 to 20% by weight.

39. The process of claim 27 wherein the additive is selected from the group consisting of water, $C_1$-$C_{10}$ alcohols, $C_1$-$C_{10}$ ethers, crown ethers, cyclic $Si_4$-$Si_8$ siloxanes, linear siloxanes, $C_1$-$C_{10}$ aldehydes, $C_1$-$C_{10}$ esters, esters, $C_1$-$C_{10}$ ketones, hydrated silica gel, and mixtures thereof.

40. The process of claim 27 wherein the additive is a latent gas generator which generates a gas selected from the group consisting of hydrogen, oxygen, nitrogen, carbon dioxide, carbon monoxide and water vapor.

41. The process of claim 40 wherein the latent gas generator is selected from the group consisting of azodicarbomanide, p-toluene sulfonyl semicarbazide, and p,p-oxybis benzene sulfonyl hydrazide.

42. The process of claim 27 wherein the boiling point of the additive is between 30° and 120° C.

43. The process of claim 27 wherein the mixture in step (3) is extruded onto a substrate, and subsequently cured to produce in step (4) a substrate with a cured coating thereon.

44. The process of claim 43 wherein the substrate is a fabric selected from the group consisting of cotton, felt, polyester, cellulose, fiberglass and polyolefin.

45. The process of claim 43 wherein the substrate is paper.

46. The process of claim 43 wherein the substrate is polyvinylchloride.

47. The process of claim 27 wherein the plastic is thermally curable and is cured by exposure to thermal conditions sufficient to volatilize the additive and initiate crosslinking of the plastic comprising the film.

48. The process of claim 27 wherein the plastic is ultraviolet radiation curable, and wherein the composition further comprises a photoinitiator and is cured by exposure to sufficient ultraviolet radiation.

49. The process of claim 48 wherein the photoinitiator is selected from the group consisting of hydroxycyclohexylphenyl ketone; hydroxymethylphenylpropanone; dimethoxyphenylacetophenone; 2-methyl-1-[4-(methylthio)phenyl]-2-morpholino-propanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-(2-hydroxy-2-propyl)ketone; diethoxyacetophenone; 2,2-di-sec-butoxyacetophenone; diethoxyphenyl acetophenone; and mixtures of these.

50. The process of claim 27 wherein the plastic is electron beam radiation-curable and sufficient electron beam radiation is applied to cure the plastic and volatilize the additive to produce a porous plastic film.

51. The process of claim 43 wherein the plastic is polyvinyl chloride, the plasticizer is n-dioctyl phthalate, the additive is water, and wherein the plastic is present in the plastisol at 40 to 50 weight percent, and the plasticizer is present in the plastisol at 20 to 40 weight percent, and the additive is present in the plastisol at about fifteen weight percent, and wherein the substrate is paper, and the curing is achieved by exposing the coated substrate to a temperature between 270° F. and 410° F., and wherein the resulting plastic film has holes up to 40 microns in diameter, and wherein the holes are present at a density of 1 to about 5,000 holes per square centimeter.

52. The process of claim 27 wherein the cured plastic film has a Perm value of from 1.0 to 20.0 using the Desiccant Method or from 2.0 to 18.0 using the Water Method.

53. The process of claim 43 wherein the coated substrate has a Perm value of from 1.0 to 20.0 using the Desiccant Method or from 2.0 to 18.0 using the Water Method.

54. A filter comprising a permeable plastic film produced by a process comprising:
  (1) combining a curable plastic and a plasticizer to form a plastisol;
  (2) combining with the plastisol an additive with a boiling point below the boiling point of the plastisol;
  (3) extruding the mixture from step (2) to form a film;
  (4) curing the film from step (3) under conditions whereby the additive volatilizes through the cured or curing film to thereby leave a multiplicity of holes in the resulting plastic film.

55. A sound absorbing material comprising a permeable plastic film produced by a process comprising:
  (1) combining a curable plastic and a plasticizer to form a plastisol;
  (2) combining with the plastisol an additive with a boiling point below the boiling point of the plastisol;
  (3) extruding the mixture from step (2) to form a film;
  (4) curing the film from step (3) under conditions whereby the additive volatilizes through the cured or curing film to thereby leave a multiplicity of holes in the resulting plastic film;
which plastic film can reduce sound transmission better than a plastic film without the multiplicity of holes.

56. A process for reducing sound transmission from a room comprising:
  (1) combining a curable plastic and a plasticizer to form a plastisol;
  (2) combining with the plastisol an additive with a boiling point below the boiling point of the plastisol;
  (3) extruding the mixture from step (2) to form a film;
  (4) curing the film from step (3) under conditions whereby the additive volatilizes through the cured or curing film to thereby leave a multiplicity of holes in the resulting plastic film which plastic film can reduce sound transmission better than a plastic film without the multiplicity of holes; and (5) applying at least one layer of said film to the walls of a room, whereby the sound transmission from the room through the wall is reduced.

57. A process for reducing mildew development within a wall comprising the steps:

(1) combining a curable plastic and a plasticizer to form a plastisol;

(2) combining with the plastisol an additive with a boiling point below the boiling point of the plastisol;

(3) coating the mixture from step (3) onto a substrate selected from the group consisting of paper, cotton, felt, polyester, cellulose, fiberglass and polyolefin;

(4) curing the coating under conditions whereby the additive volatilizes through the cured or curing film to thereby leave a multiplicity of holes in the resulting coated substrate;

(5) applying the coated substrate to a wall, whereby water vapor within the wall can permeate the coated substrate to reduce mildew development within the wall.

* * * * *